United States Patent
Gulati et al.

(10) Patent No.: US 11,228,995 B2
(45) Date of Patent: Jan. 18, 2022

(54) DISTRIBUTED SYNCHRONIZATION MECHANISM

(71) Applicant: QUALCOMM Incorporated, San Diego, CA (US)

(72) Inventors: Kapil Gulati, Hillsborough, NJ (US); Shailesh Patil, San Diego, CA (US); Sudhir Kumar Baghel, Hillsborough, NJ (US); Naga Bhushan, San Diego, CA (US); Tien Viet Nguyen, Bridgewater, NJ (US); Arjun Bharadwaj, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/534,770

(22) Filed: Aug. 7, 2019

(65) Prior Publication Data
US 2020/0053683 A1    Feb. 13, 2020

Related U.S. Application Data

(60) Provisional application No. 62/716,714, filed on Aug. 9, 2018.

(51) Int. Cl.
*H04L 12/28*   (2006.01)
*H04W 56/00*   (2009.01)
(Continued)

(52) U.S. Cl.
CPC ......... *H04W 56/0045* (2013.01); *G01S 19/04* (2013.01); *H04W 56/0035* (2013.01); *H04W 56/0065* (2013.01)

(58) Field of Classification Search
CPC . H04J 11/0069; H04W 56/001; H04W 76/14; H04W 56/005; H04W 56/0015;
(Continued)

(56) References Cited

U.S. PATENT DOCUMENTS

2014/0086219 A1\* 3/2014 Suzuki .............. H04W 56/0005
                                                   370/336
2017/0034799 A1\* 2/2017 Kim .................... H04W 56/003
(Continued)

FOREIGN PATENT DOCUMENTS

| EP | 3002981 A1 | 4/2016 |
| EP | 3322234 A1 | 5/2018 |
| WO | 2017171284 A1 | 10/2017 |

OTHER PUBLICATIONS

International Search Report and Written Opinion—PCT/US2019/045758—ISA/EPO—dated Oct. 28, 2019.

*Primary Examiner* — John Pezzlo
(74) *Attorney, Agent, or Firm* — Arent Fox LLP

(57) ABSTRACT

Aspects of the present disclosure provide synchronization techniques for user equipment (UEs) that may be otherwise unable to support sidelink communication a synchronized UE and may have also lost global navigation satellite system (GNSS) and/or Evolved Node Base Stations (eNBs) as a synchronization source. In such instance, the unsynchronized UE may utilize reference signals (RS) from the data packets received from other UEs to track the timing and perform autonomous timing adjustments based thereon for synchronized packet transmission or reception.

25 Claims, 7 Drawing Sheets

(51) Int. Cl.
*G01S 19/04* (2010.01)
*H04J 1/16* (2006.01)

(58) Field of Classification Search
CPC ... H04W 56/00; H04W 56/002; H04W 92/18; H04W 56/0035
USPC ........................................ 370/252, 329, 503
See application file for complete search history.

(56) References Cited

U.S. PATENT DOCUMENTS

| | | | |
|---|---|---|---|
| 2017/0034800 A1 | 2/2017 | Abedini et al. | |
| 2017/0078991 A1* | 3/2017 | Chae .................... | H04W 48/20 |
| 2019/0116571 A1* | 4/2019 | Yang ................. | H04W 56/0035 |
| 2019/0223241 A1* | 7/2019 | Manolakis ............ | H04W 76/14 |

* cited by examiner

DISTRIBUTED SYNCHRONIZATION MECHANISM

CROSS-REFERENCE TO RELATED APPLICATION(S)

This application claims benefit of U.S. Provisional Application Ser. No. 62/716,714, entitled "Distributed Synchronization Mechanism" and filed Aug. 9, 2018, which is expressly incorporated by reference herein in its entirety.

BACKGROUND

The present disclosure relates generally to communication systems, and more particularly, techniques for distributed synchronization of user equipment (UE) in 5G New Radio (NR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One such example may include device-to-device (D2D) communication such as, but not limited to, cellular vehicle-to-everything (CV2X) communications that may be implemented as part of the 5G NR technology deployment. In such system, user equipment (UE) may directly communicate with other UEs by directing radio signals in specific directions. Generally, in such systems, the synchronization mechanism (e.g., timing and/or frequency) for the UE may be based on the UE connection to one or more of global navigation satellite system (GNSS), a cellular base station (also referred to as Evolved Node Base Stations (eNBs)), or a sidelink synchronized SyncRef UEs (e.g., one or more UEs that may synchronized to GNSS or eNB and with which the first UE has a sidelink synchronization). In an absence of connection with GNSS or eNB, the synchronization for the first UE may require a sidelink synchronization with a second UE (e.g., SyncRef UE). However, not all UEs support sidelink synchronization capabilities. Thus, the UEs that suffer a signal loss with GNSS and/or eNB coverage and are unable to support sidelink synchronization with another UE are adversely impacted, as their timing will eventually drift out of synchronization and they will no longer be able to communicate effectively.

SUMMARY

Aspects of the present disclosure provide synchronization techniques for UEs that may be otherwise unable to support sidelink communication via SyncRef UE and may have also lost communication with a GNSS and/or eNB as a synchronization source. In such instance, the unsynchronized UE may utilize reference signals (RS) from the data packets received from other UEs to track synchronization timing and perform autonomous timing adjustments for packet transmissions.

In one example, a method for wireless communications implemented by an unsynchronized UE is disclosed. The method may include receiving, at the unsynchronized UE, a data packet from a synchronized UE. The method may further include determining an adjusted timing offset value based on reference signals included in the data packet from the synchronized UE. The method may further include adjusting a timing of the unsynchronized UE based on the adjusted timing offset value to define an adjusted timing, and transmitting or receiving, at the unsynchronized UE, a packet based on the adjusted timing.

In another example, an unsynchronized UE for wireless communication is disclosed. The unsynchronized UE may include a memory configured to store instructions and a processor communicatively coupled with the memory. The processor may be configured to execute the instructions to receive, at the unsynchronized UE, a data packet from a synchronized UE. The processor may further be configured to determine an adjusted timing offset value based on reference signals included in the data packet from the synchronized UE. The processor may further be configured to adjust a timing of the unsynchronized UE based on the adjusted timing offset value to define an adjusted timing, and transmitting or receiving, at the unsynchronized UE, a packet based on the adjusted timing.

In another example, a non-transitory computer readable medium storing instructions, executable by a processor for wireless communications by an unsynchronized UE is disclosed. The computer readable medium may include instructions for receiving, at the unsynchronized UE, a data packet from a synchronized UE. The computer readable medium may further include instructions for determining an adjusted timing offset value based on reference signals included in the data packet from the synchronized UE. The computer readable medium may further include instructions for adjusting a timing of the unsynchronized UE based on the adjusted timing offset value to define an adjusted timing, and transmitting or receiving, at the unsynchronized UE, a packet based on the adjusted timing.

In another example, another method, apparatus, and computer readable medium for wireless communications implemented by a synchronized UE is disclosed. The method may include receiving, at the synchronized UE, a request for synchronization assistance from an unsynchronized UE to correct a timing of the unsynchronized UE. In some examples, the request may include information regarding an adjusted timing offset value calculated by the unsynchronized UE based on reference signals included in one or more data packets from one or more synchronized UEs. The method may further include calculating, at the synchronized UE, a timing correction value for the unsynchronized UE in response to the request. The method may further include transmitting a response message to the unsynchronized UE that includes the timing correction value. In some examples, the apparatus may include a memory configured to store instructions and a processor communicatively coupled with the memory. The processor may be configured to execute the instructions to perform the above-noted methods. Additionally or alternatively, in some examples, a non-transitory computer readable medium storing instructions, executable by a processor for wireless communications implemented by a synchronized UE may also be disclosed. In such instance, the computer readable medium may include instructions for performing one or more above-noted method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
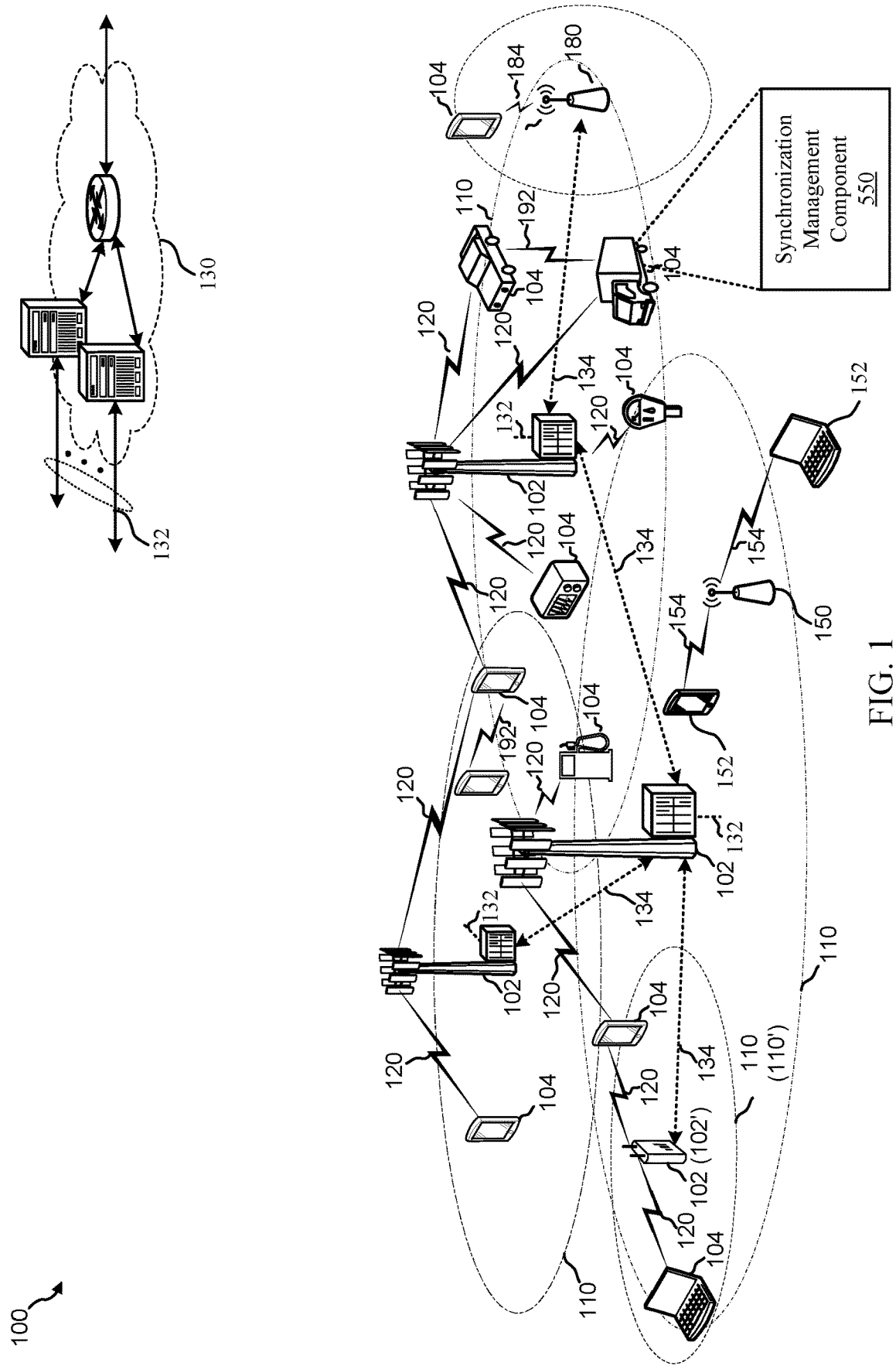
FIG. 1 is a schematic diagram of an example of a wireless communications system in accordance with aspects of the present disclosure.

As discussed above, in D2D communication systems, such as but not limited to CV2X systems, which may be implemented as part of the 5G NR technology deployment, UEs may directly communicate with each other by directing radio signals in specific directions. In such systems, a UE may rely on one or more of a GNSS, an eNB, or a synchronized UEs as the "synchronization source" with respect to timing and frequency carrier synchronization. Timing and frequency carrier synchronization is a fundamental requirement for any wireless communication system to work properly. Timing synchronization is the process by which a receiver node determines the correct instants of time at which to sample the incoming signal. Carrier synchronization is the process by which a receiver adapts the frequency and phase of its local carrier oscillator with those of the received signal. Similarly, a transmitter node uses timing and carrier synchronization to determine a proper timing and frequency and/or phase of the local carrier oscillator for transmitting a signal.

In some cases, when a UE is out of coverage of GNSS or eNB, the UE may utilize synchronization signals transmitted by one or more secondary UEs (also referred to as "SyncRef UEs") to derive the timing and frequency synchronization. In this case, the SyncRef UE may periodically transmit sidelink synchronization signals, e.g., every 160 millisecond (ms), on a resource depending on the synchronization reference of the SyncRef UE. Synchronization signal transmission and reception, however, is a UE capability that may not be widely adopted by all the UEs in the system. Specifically, due to the additional complexities related to implementing the searcher related to sidelink synchronization and related synchronization procedures, not all UEs support sidelink synchronization capabilities. In such instances, the UEs that are unable to support the sidelink synchronization capability and that suffer a signal loss with GNSS and/or eNB coverage will likely be adversely impacted in terms of their ability to receive and transmit messages.

In some cases, the UE that lacks sidelink synchronization capabilities and suffers a signal loss with GNSS or eNB coverage may nonetheless continue to transmit as long as the time and frequency error remain within predetermined limits specified by 3rd Generation Partnership Project (3GPP) (e.g., timing error requirement of +/−12Tx and frequency error requirement of 0.1 parts per million (ppm)). However, due to temperature changes, the UE oscillator may drift over time, and thus the time and frequency error may not be guaranteed to remain within the specified limits for a long period of time (e.g., greater than 5 seconds). As such, in current systems, the UE that loses GNCC and/or eNB coverage and that lacks sidelink synchronization capabilities may not be able to communicate with other UEs beyond 4-5 seconds from the loss, as the timing and/or frequency error will eventually exceed the predetermined threshold.

Aspects of the present disclosure address the above-identified problem by implementing synchronization techniques for UEs that may be otherwise unable to support sidelink communication via SyncRef UE and may have also lost the GNSS/eNB as synchronization source. Such UEs may be referred to as unsynchronized UEs. Because the timing error requirements are more stringent than the frequency error requirements, aspects of the present disclosure provide techniques to allow the unsynchronized UE to utilize reference signals (RS) from the data packets received from other UEs to track the timing and perform autonomous timing adjustments to enable synchronized signal transmissions and/or reception. For example, the unsynchronized UE may transmit a request for synchronization assistance from the synchronized UE to correct the timing of the unsynchronized UE. In some examples, the request may include information regarding the adjusted timing offset value. The unsynchronized UE may further receive a response message from the synchronized UE that includes a timing correction in response to the request. As such, the unsynchronized UE may be configured to revise the adjusted timing of the unsynchronized UE based on the timing correction received from the synchronized UE for subsequent transmissions.

Various aspects are now described in more detail with reference to the FIGS. 1-7. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 in which a UE 104 lacking sidelink synchronization capability and losing communication with a GNSS and/or base station can autonomously synchronize its timing based on reference signals received in data packets from one or more synchronized UEs. The wireless communications system (also referred to as a wireless wide area network (WWAN)) includes base stations 102, UEs 104, and one or more core networks 130, such as 5G NR core network, and/or a 4G LTE core network, often referred to as an Evolved Packet Core (EPC), and/or any other communication technology core network. In some examples, the core network 130 may provide user authentication, access authorization, tracking, internet protocol (IP) connectivity, and other access, routing, or mobility functions. The core network 130 may allow circuit-switched connectivity to the back-end operator network (e.g., public land mobile network (PLMN) and/or packet-switched connectivity to private networks, operator's intranet or to the public internet.

The base stations 102 may include macro cells (high power cellular base station) and/or small cell base stations (low power cellular base station). The base stations 102 (collectively referred to as Evolved Universal Mobile Telecommunications System (UMTS) Terrestrial Radio Access Network (E-UTRAN)) interface with the one or more core networks 130 through one or more backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 130) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Figure 2:
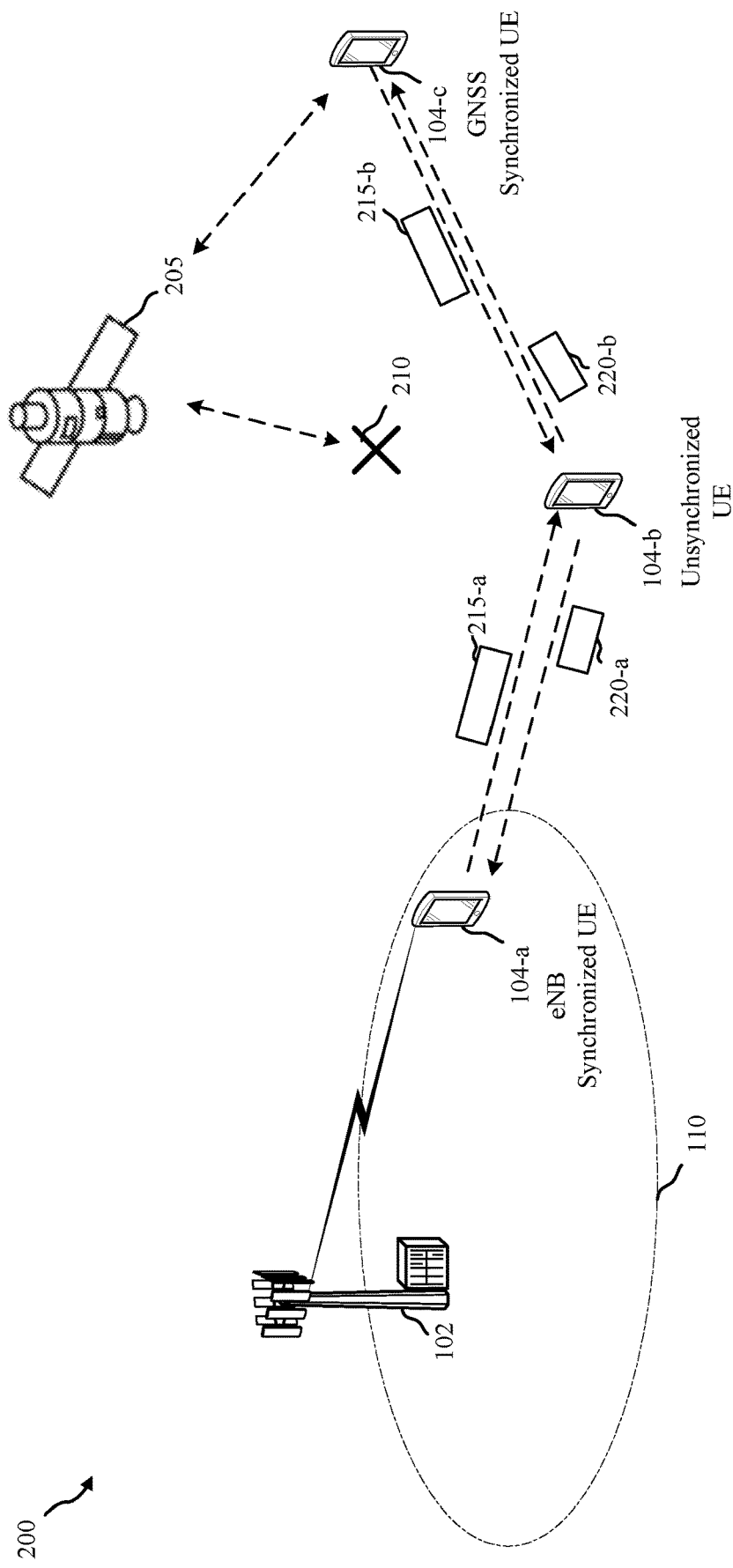
FIG. 2 is a schematic diagram of an example scenario for implementing supplemental synchronization mechanism for the UEs in accordance with aspects of the present disclosure.

In some examples, the UE 104 may additionally communicate with a global navigation satellite system (GNSS) (not shown, but see FIG. 2). GNSS are widely deployed to provide the ability for ground or air-based GNSS receivers to derive their positions, navigation, and timing, often referred to as "PNT." A GNSS receiver may be included in many products and civil and defense infrastructure elements in different forms. It may be included in a UEs 104 comprising mobile devices ranging from handheld receivers used by hikers or drivers, to smartphones, and to more sophisticated, specialized receivers used for high-end survey and mapping applications where higher positioning accuracy is desired or required.

In some examples, the UE 104 may derive the timing and frequency synchronization information from one or more of GNSS, eNB, or syncRef UEs. As noted above, timing and frequency synchronization is a fundamental requirement for any wireless communication system to work properly. Timing synchronization is the process by which a receiver node (e.g., UE 104) determines the correct instants of time at which to sample the incoming signals that may be received from other devices (e.g., other UEs 104). Carrier synchronization is the process by which a receiver adapts the frequency and phase of its local carrier oscillator with those of the received signal.

Certain UEs 104 may communicate with each other using device-to-device (D2D) communication link 192. The D2D communication link 192 may use the DL/UL WWAN spectrum, although other spectrums may be utilized. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, V2X (e.g., vehicle to other device), FlashLinQ, WiMedia, Bluetooth, ZigBee, Wi-Fi based on the IEEE 802.11 standard, LTE, or NR.

When a UE 104 is out of coverage (e.g., coverage area 110) of eNB 102 and/or GNSS (not shown), the UE 104 equipped with sidelink synchronization capabilities may generally utilize synchronization signals transmitted by one or more SyncRef UEs 104 to derive the timing and frequency synchronization. However, not all UEs 104 necessarily support sidelink synchronization capabilities that allow the UE 104 to receive and process synchronization signals transmitted by the SyncRef UE 104.

To address issues related to UEs that do not support sidelink synchronization capabilities and that have recently lost GNSS/eNB coverage, features of the present disclosure provide a synchronization management component 550 implemented on a UE 104 (that may be part of a vehicle or a separate UE 104 associated with the vehicle and operating in D2D communication). In some examples, the synchronization management component 550 allow the unsynchronized UE to utilize reference signals (RS) from the data packets received from other UEs to track timing and to perform autonomous timing adjustments for signal transmission or reception.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) or eNodeB (eNB) 180 (one or both of gNB and eNB may also be referred to as "base station") may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. It should be appreciated by those of ordinary skill in the art that the present invention is not just limited to mmW, but may also include any other frequencies used for wireless communication. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The base station 102 provides an access point to the one or more core networks 130 for the UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the wireless communication system may be a mmW communication system. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

Turning next to FIG. 2, an example scenario 200 for implementing a supplemental synchronization mechanism for the UEs 104 in accordance with aspects of the present disclosure is illustrated. The wireless communications system in the example scenario 200 may include one or more UEs 104 and eNBs 102 described with reference to FIG. 1 above. In some instances, one or more UEs 104 (e.g., UEs 104-a) may be in the coverage area 110 of an eNB 110, and thus initially (e.g., prior to implementing the supplemental synchronization mechanism) receive synchronization information from the eNB 102. Additionally or alternatively, one or more additional UEs 104 (e.g., UEs 104-b and 104-c) may move from initially being located inside (and hence having synchronization with eNB 102) to being located outside the coverage area 110 of eNB 102 such that, in some situations, the UE 104-b and UE 104-c may rely on GNSS 205 for continued timing and frequency synchronization information. As noted above, GNSS 205 are widely deployed to provide the ability for ground or air-based GNSS receivers (e.g., UEs 104) to derive their positions, navigation, and timing information.

However, in some situations, UE 104-b, for example, may lose connection or communication 210 with the GNSS 205 while the second UE 104-c may continue to maintain synchronization with the GNSS 205. In the absence of synchronization signals from either the eNB 102 or the GNSS 205, the UEs 104 typically rely on synchronization signals transmitted by one or more secondary UEs (e.g., UE 104-a) that are synchronized (e.g., SyncRef UEs) to derive the timing and frequency synchronization. Generally, the SyncRef UE may transmit sidelink synchronization signals periodically, e.g., every 160 ms, on a designated resource depending on the synchronization reference of the SyncRef UE. Because the synchronization signals transmitted by SyncRef UE are special signals transmitted on separate resources for purposes of facilitating timing and frequency synchronization, not all UEs 104 may implement the necessary hardware and procedures for transmission and reception of such synchronization signals. As such, the UE 104-b (alternatively referred to as an "unsynchronized" UE) that is unable to support sidelink synchronization capability and that suffers a signal loss 210 with GNSS 205 while also not having a connection with the eNB 102 may be adversely impacted in terms of its ability to receive and transmit messages.

In such situations, while the unsynchronized UE 104-*b* may be able to continue transmitting messages for a short period of time (e.g., 5 seconds) after the loss of signal (and by extension, loss of synchronization information), the UE 104-*b* may not be able to continue such transmissions beyond a limited period of time as the time and frequency error drifts. For example, due to temperature changes, the UE 104-*b* oscillator may drift over time, and thus the time and frequency error may not be guaranteed to remain within the specified limits set forth by 3GPP (e.g., timing error requirement of +−12Tx and frequency error requirement of 0.1 ppm) to allow the UE 104-*b* to continue transmitting to other UEs 104-*a* or receiving decodable signals from other UEs.

To this end, features of the present disclosure provide supplemental synchronization techniques to help unsynchronized UEs 104-*b* that do not support sidelink synchronization capability and that lose connection or communication with GNSS 205 while located outside the coverage area 110 of eNB 102. Specifically, it should be appreciated that with respect to the specified limits set forth by 3GPP that allow the unsynchronized UE 104-*b* to continue transmitting messages so long as the time and frequency error for UE 104-*b* remains within predetermined limits, such timing error requirement may be more stringent than the frequency error requirements. As such, features of the present disclosure provide techniques for the unsynchronized UE 104-*b* that loses GNSS/eNB synchronization while outside the coverage 110 of eNB 102 to track the timing using reference signals included in data packets 215 received in D2D communications from other synchronized UEs (e.g., eNB synchronized UE 104-*a* and/or GNSS synchronized UE 104-*c*). Unlike the sidelink synchronization capability that requires specialized hardware and procedures to transmit and receive synchronization signals from SyncRef UEs, unsynchronized UE 104-*b* may be able to track the timing from simply decoding the reference signals included in the data packets that are received by the unsynchronized UE 104-*b* in D2D communications, without relying on the specialized sidelink synchronization capability.

Figure 3:
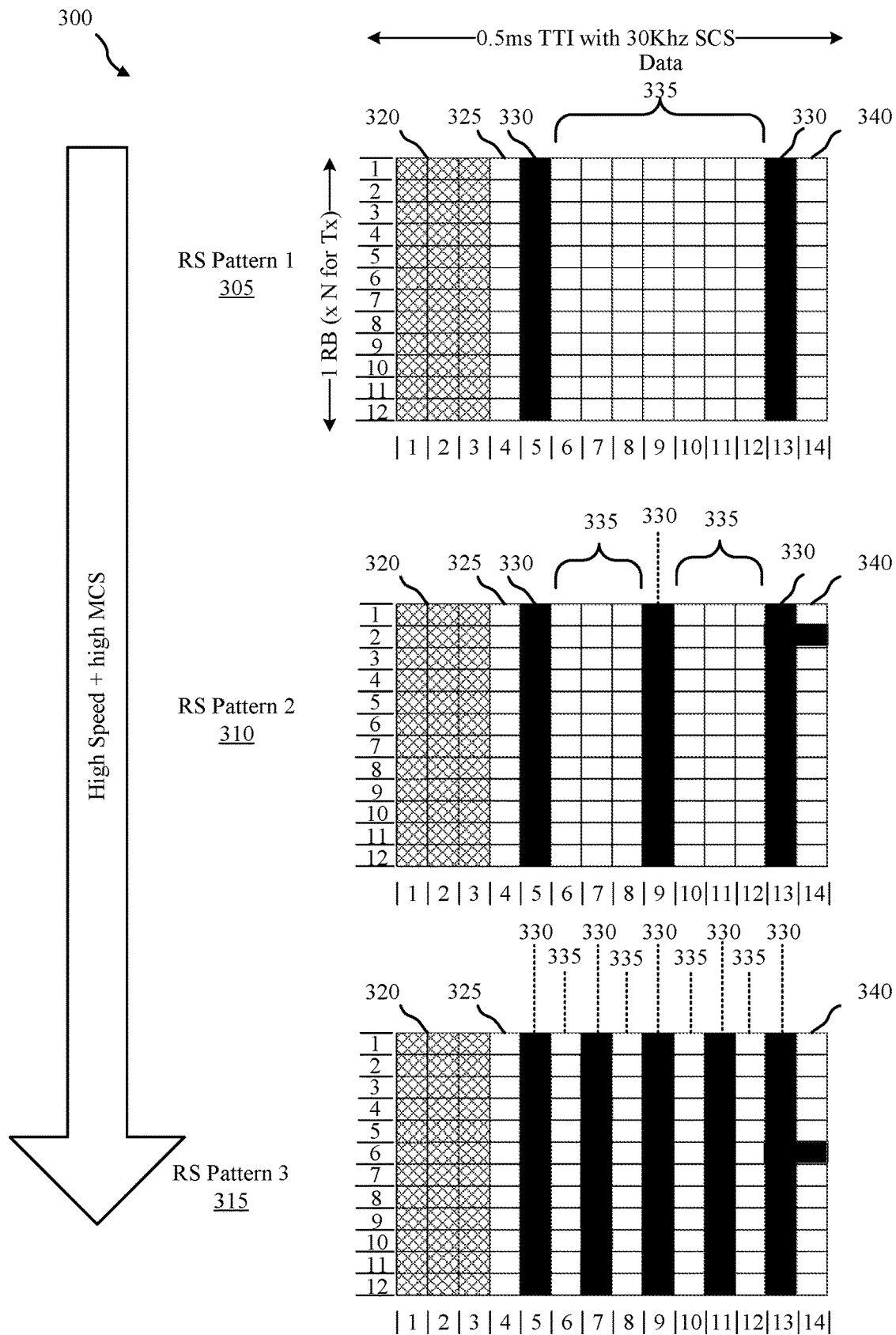
FIG. 3 is a diagram of various examples of data packet formats that may be selected by the transmitter in accordance with aspects of the present disclosure.

Turning briefly to FIG. 3, a diagram 300 of various examples of data packet formats that may be selected by the transmitter device (e.g., eNB synchronized UE 104-*a* and/or GNSS synchronized UE 104-*c*) is illustrated. The various examples of data packet formats that may be select may include, but are not limited to first reference signal pattern 305, second reference signal pattern 310, and third reference signal pattern 315. Although the diagram 300 shows three reference signal patterns, it should be appreciated that the transmitter may select a reference signal pattern from a larger set of available reference signal patterns (e.g., 5-6 or more reference signal patterns). The reference signal density in time may depend on the speed of transmitter (and assumed speed of receiver) and modulation coding scheme (MCS) of the transmission. In some examples, the data packet 215 may include the listen before talk (LBT) sequence portion 320, the control portion 325, the demodulation reference signals (DMRS) 330, data 335, and feedback/gap 340.

Turning back to FIG. 2, implementing the synchronization techniques of the present disclosure may include a UE 104 that is synchronized to one or more of eNB 102 (e.g., "eNB synchronized" UE 104-*a*), GNSS 205 (e.g., "GNSS synchronized" UE 104-*c*), or another SyncRef UE 104 (collectively "synchronized UEs") transmitting a synchronization state as part of the data packet 215 (e.g., 215-*a* from UE 104-*a* and 215-*b* from UE 104-*c*) to the unsynchronized UE 104-*b*. In some examples, the synchronization state may identify whether the synchronized UE 104 (e.g., UE 104-*a* or UE 104-*c*) is synchronized to one or more of GNSS 205, eNB 102, or another SyncRef UE 104. For instance, the synchronization state may be a binary value of "1" or "0" denoting whether the UE 104-*a*, for example, is synchronized to one or more of GNSS 205, eNB 102, or another SyncRef UE 104 (e.g., synchronization state="1" if the UE 104-*a* is synchronized and synchronization state="0" if the UE 104-*a* is not synchronized). Additionally or alternatively, the synchronization state may be a value that indicates the synchronization source (e.g., specifically identifying which of the one or more GNSS 205, eNB 102, or another SyncRef UE 104 is synchronized with). Thus, in the illustrated example, both synchronized UEs 104-*a* and 104-*c* may transmit, as part of the data packet 215, a synchronization state of value 1 (denoting synchronized UE), for example. It should be appreciated that synchronization state indication is not limited to using binary 1 or 0 values, but may include any value or data indicating the synchronization state of the UE 104.

In the event that the synchronized UE 104 is synchronized with a SyncRef UE (not shown), as opposed to GNSS 205 or eNB 102, the synchronization state may further include information regarding a hop-count associated with the synchronization. Hop-count may be a value that indicates a number or hops or nodes from a GNSS or eNB synchronization source. The unsynchronized UE, such as UE 104-*b*, may be interested in the hop count, as it may provide an indication of the reliability of the timing/synchronization information received from such a SyncRef UE, as the propagation time increases with an increase in the number of hops. In some aspects, the synchronization state that may be included as part of the data may be transmitted as a media access control (MAC) control element (CE). In other examples, the synchronization state may be transmitted in the control portion of the data packet 215.

The unsynchronized UE 104-*b* that was previously synchronized to GNSS 205 or eNB 102 prior to losing connection or communication may receive the data packets 215 and, in response to losing the connection or communication, may perform autonomous timing adjustment for packet transmissions 220 when Coordinated Universal Time or Universal Time Coordinated (UTC) is not available at a given time based in part on the reference signals included in the data packet 215. The reference signal density in time may depend on the speed of transmitter (and assumed speed of receiver) and MCS of the transmission, as described above with respect to the examples of FIG. 2.

In one example, the timing for the unsynchronized UE 104-*b* may be adjusted to a timing associated with the earliest detectable path. For example, the unsynchronized UE 104-*b* receives a first data packet 215-*a* from eNB synchronized UE 104-*a* prior to receiving a second data packet 215-*b* from GNSS synchronized UE 104-*c* due to the respective distance and propagation delay. In such instance, the first data packet 215-*a* is associated with the earliest detectable path, and the unsynchronized UE 104-*b* may adjust the timing based on the reference signals include in the first data packet 215-*a* received from eNB synchronized UE 104-*a* as opposed to the GNSS synchronized UE 104-*c*. Additionally or alternatively, the timing adjustments may be based on reference signal received power (RSRP) and time delay estimation (earliest path and/or center of mass, e.g., an average or mean or other mathematical function) from a plurality of, or from all synchronized UEs (e.g., eNB synchronized UE 104-*a* and/or GNSS synchronized UE 104-*c*).

Upon adjusting the timing based on the reference signals from one or more received data packets 215, the unsynchronized UE 104-*b* may transmit one or more packets 220 to other UEs 104 in the vicinity (and may receive other signals based on the adjusted timing). Because the unsynchronized UE 104-*b* is not synchronized directly with one or more of eNB 102, GNSS 205, or SyncRef UE 104, the data transmission 220 by unsynchronized UE 104-*b* may include a synchronization state (e.g., synchronization state="0") that informs other UEs that the unsynchronized UE 104-*b* is relying on autonomous timing adjustments. In some examples, the transmission 220 may further include the actual value of adjustment (e.g., timing offset value) as part of the synchronization state information that is included in the transmission 220. In some cases, when UE 104-*b* first loses synchronization and before making a timing adjustment, UE 104-*b* may transmit data packets with the synchronization state information. By indicating that it is relying on autonomous timing adjustments, UE 104-*b* notifies other UEs to not rely on the timing of its transmission for adjusting their own timing.

In some examples, the unsynchronized UE 104-*b* may request (and receive) assistance from the synchronized UEs (e.g., eNB synchronized UE 104-*a* and/or GNSS synchronized UE 104-*c*) to correct its timing.

Figure 4:
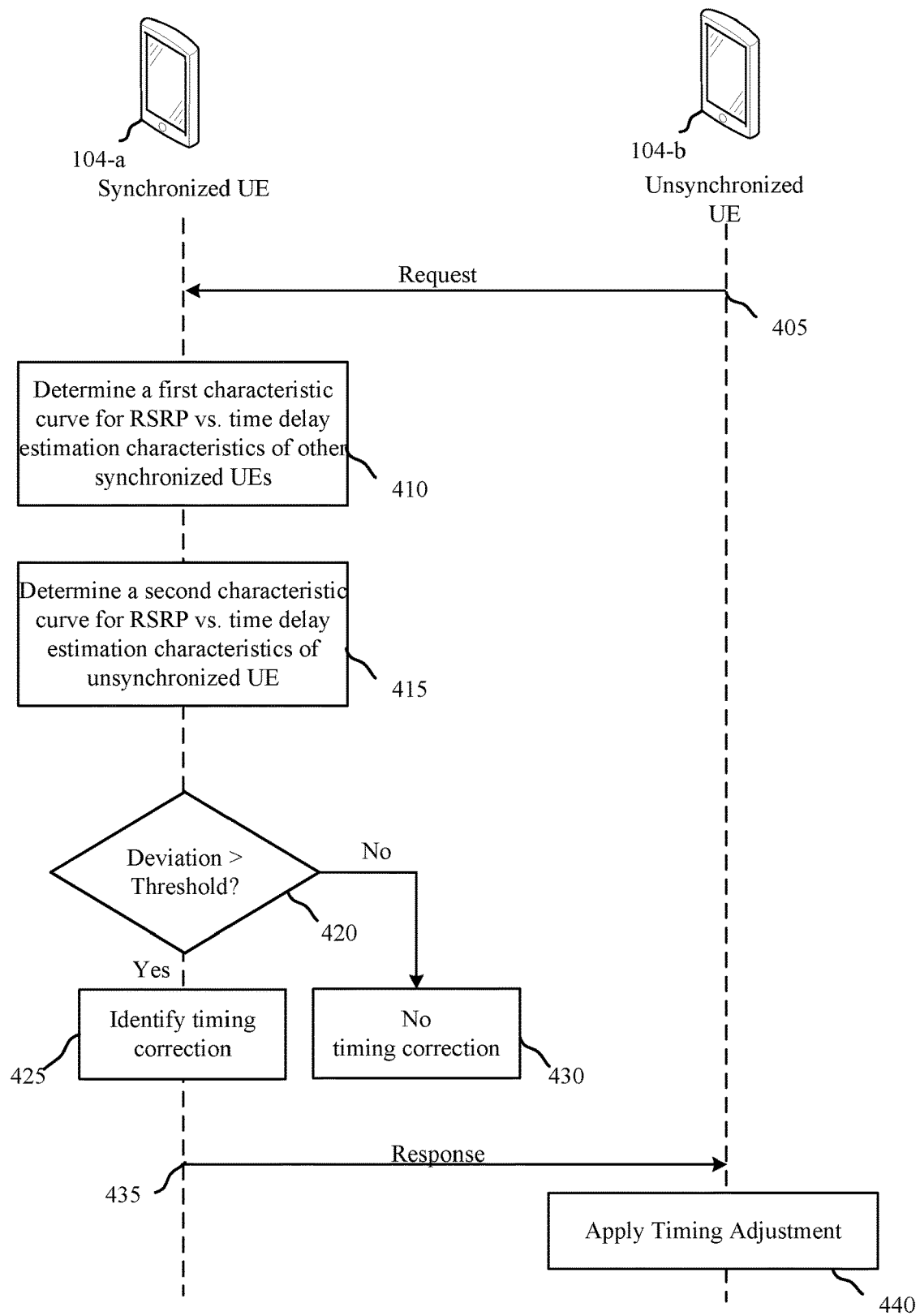
FIG. 4 is a call flow diagram for adjusting a timing of an unsynchronized UE in collaboration with the synchronized UEs in accordance with aspects of the present disclosure.

FIG. 4 is a call flow diagram 400 for adjusting the timing of unsynchronized UE 104-*b* in collaboration with the synchronized UEs 104-*a*/104-*c*. At 405, the unsynchronized UE 104-*b* may generate a request via the modem 514 (see FIG. 5) and more particularly the message generation component 560 included in the synchronization management component 550. In some examples, the request may be part of the transmission 220 described with reference to FIG. 2. The request may include the synchronization state of the unsynchronized UE 104-*b* (e.g., synchronization state="0") that informs other UEs 104 that the unsynchronized UE 104-*b* is relying on autonomous timing adjustments and optionally may include the adjusted timing offset value. The unsynchronized UE 104-*b* may transmit the request, via the transceiver 502 (see FIG. 5) and antennas 565 to directionally transmit the packets 220 as a D2D communication to one or more synchronized UEs (e.g., eNB synchronized UE 104-*a* and/or GNSS synchronized UE 104-*c*). The targets of the unsynchronized UE 104-*b* request may be based on the received data packets 215 from UEs 104 that indicated their synchronization state as one that is synchronized to one or more of eNB 102, GNSS 205, or SyncRef UE 104. The request may be transmitted as part of the MAC CE in data or separately sent in the control portion 320 of the data packet.

In the event that the unsynchronized UE 104-*b* is not transmitting data to a given synchronized UE (e.g., eNB synchronized UE 104-*a*) from which the unsynchronized UE 104-*b* wants to request synchronization assistance, the unsynchronized UE 104-*b* may transmit the request as part of the data packet 220 where the data payload may be set to known value (e.g., 0) that indicates the request for synchronization assistance. In other examples, a special transmission format that indicates the request for synchronization assistance may be used with more RS symbols (e.g., third reference signal pattern 315 or additional patterns as described with reference to FIG. 3) to aid with channel estimation at the synchronized UE 104-*a* in lieu of transmitting data. In other words, when the unsynchronized UE 104-*b* has no data to send to the synchronized UE 104-*a*, the unsynchronized UE 104-*b* may leverage the lack of data to favor transmission of higher density reference signals over time.

At 410, the synchronized UE 104-*a* that may receive the request may determine a first characteristic curve for RSRP against the time delay estimation (e.g., first arrival path and center of mass) characteristics in the local neighborhood using the transmissions from other synchronized UEs 104. At 415, the synchronized UE 104-*a* may determine a second characteristic curve for RSRP against the time delay estimation characteristics of the unsynchronized UE 104-*b*. At 420, the synchronized UE 104-*a*, and more particularly the timing correction component 570 of the modem 514 (see FIG. 5) may determine whether a deviation between the first characteristic curve and the second characteristic curve exceeds a threshold. Specifically, the synchronized UE 104-*a* may determine if the observed RSRP vs time delay estimation of the un-synchronized UE 104-*b* deviates significantly from the characteristics determined using synchronized UEs. If the deviation When the deviation exceeds the threshold, the synchronized UE 104-*a*, at 425, may generate a timing correction based on the amount of deviation. For example, the timing correction may be based on a least-square (LS) fitting to the characteristic curve. Alternatively, at 430, if the deviation does not exceed the threshold, the synchronized UE 104-*a* may not apply new timing correction.

At 435, the synchronized UE 104-*a* may transmit a response to the unsynchronized UE 104-*b*. The response may or may not include timing corrections (e.g., timing offset value that the UE 104-*b* should adjust) depending on whether the deviation had exceeded the threshold. In some examples, if the synchronized UE 104-*a* is transmitting data to the unsynchronized UE 104-*b*, the timing correction response may be embedded as part of data (MAC CE) or in the control portion of a packet. However, if the synchronized UE 104-*a* is not transmitting data to the unsynchronized UE 104-*b*, the synchronized UE 104-*a* may send separate data transmission to indicate the response and/or timing correction to the unsynchronized UE 104-*b*. In some examples, the message generation component 560 (see FIG. 5) in conjunction with the transceivers 502 and RF front end 588 may transmit the response to the unsynchronized UE 104-*b*.

If the response includes the timing correction, the unsynchronized UE 104-*b*, at 440, may revise its timing (or its previously adjusted timing) based on the timing corrections. If the unsynchronized UE 104-*b* transmitted the request to more than one synchronized UEs 104 (e.g., eNB synchronized UE 104-*a* and GNSS synchronized UE 104-*c*) and received multiple timing corrections from multiple synchronized UEs 104, the unsynchronized UE 104-*b* may aggregate the timing corrections received from multiple synchronized UEs 104 to determine an aggregated timing correction to apply. In one case, the aggregated timing correction may be mean, average, or some other weighted mathematical function of all or some subject of the timing correction values. In an example of using a subset, the unsynchronized UE 104-*b* may calculate a weighted mean (or other weighted value) based on the synchronization state of only the synchronized UEs that transmitted the timing corrections while excluding the timing corrections received from other unsynchronized UEs. Further, for example, in weighting the received timing correction values, the unsynchronized UE 104-*b* may prioritize timing corrections received from an eNB synchronized UE 104-a over a GNSS synchronized UE 104-c and SyncRef UE 104. It should be noted that other prioritizations may be utilized, for example, based on a perception or a known measure of how reliable a timing correction is from a given source. Thus, in some examples, the unsynchronized UE 104-b may prioritize one or more synchronized sources to place more weight on correction values received from multiple synchronized UEs 104.

Figure 5:
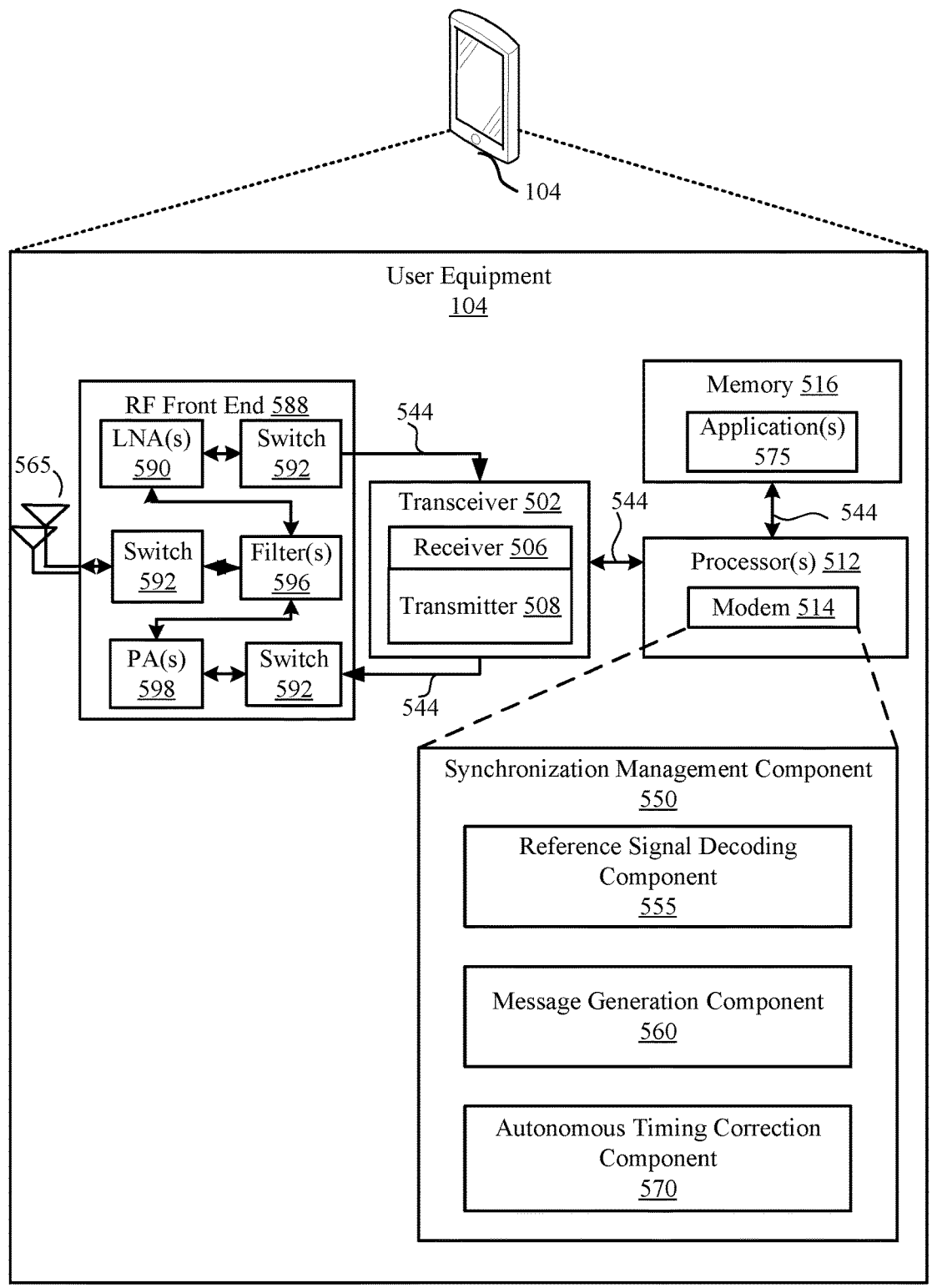
FIG. 5 is a schematic diagram of an example implementation of various components of a UE in accordance with various aspects of the present disclosure.

FIG. 5 illustrates a non-limiting example of hardware components and subcomponents of UE 104 for implementing one or more methods (e.g., methods 600 and 700) described herein in accordance with various aspects of the present disclosure. In some examples, the UE 104 may be an example of a synchronized UE 104-a or unsynchronized UE 104-b described with reference to FIGS. 1-4. One example of an implementation of the UE 104 may include a variety of components, some of which have already been described above, but including components such as one or more processors 512, memory 516 and transceiver 502 in communication via one or more buses 544, which may operate in conjunction with the synchronization management component 550 to perform functions described herein related to including one or more methods (e.g., 600 and 700) of the present disclosure.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to synchronization management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with synchronization management component 550 may be performed by transceiver 502.

The memory 516 may be configured to store data used herein and/or local versions of application(s) 575 or synchronization management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining synchronization management component 550 and/or one or more of its subcomponents, and/or data associated therewith, when the UE 104 is operating at least one processor 512 to execute synchronization management component 550 and/or one or more of its subcomponents.

The synchronization management component 550 may further include a reference signal decoding component 555, a message generation component 560, and an autonomous timing correction component 570 to perform one or more methods of the present disclosure. For example, the reference signal decoding component 555 may determine an adjusted timing offset value based on reference signals included in the data packet from the synchronized UE. Specifically, aspects of the present disclosure provide techniques to allow the unsynchronized UE to utilize reference signals from the data packets received from other UEs to track the timing and perform autonomous timing adjustments to enable synchronized signal transmissions and/or reception. For example, the unsynchronized UE may transmit a request for synchronization assistance from the synchronized UE to correct the timing of the unsynchronized UE. In some examples, the request may include information regarding the adjusted timing offset value. The unsynchronized UE may further receive a response message from the synchronized UE that includes a timing correction in response to the request. In some examples, the request and/or the response may be generated by the message generation component 560 based on whether the UE 104 is acting as a synchronized or unsynchronized UE. In some examples, autonomous timing correction component 570 may allow the unsynchronized UE to revise the adjusted timing of the unsynchronized UE based on the timing correction received from the synchronized UE for subsequent transmissions.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 365 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 488. In an aspect, the transceiver 502 may be tuned to operate at specified frequencies such that transmitting device can communicate with, for example, one or more base stations 102 or one or more cells associated with one or more base stations 102. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on UE configuration information associated with transmitting device as provided by the network during cell selection and/or cell reselection.

Figure 6:
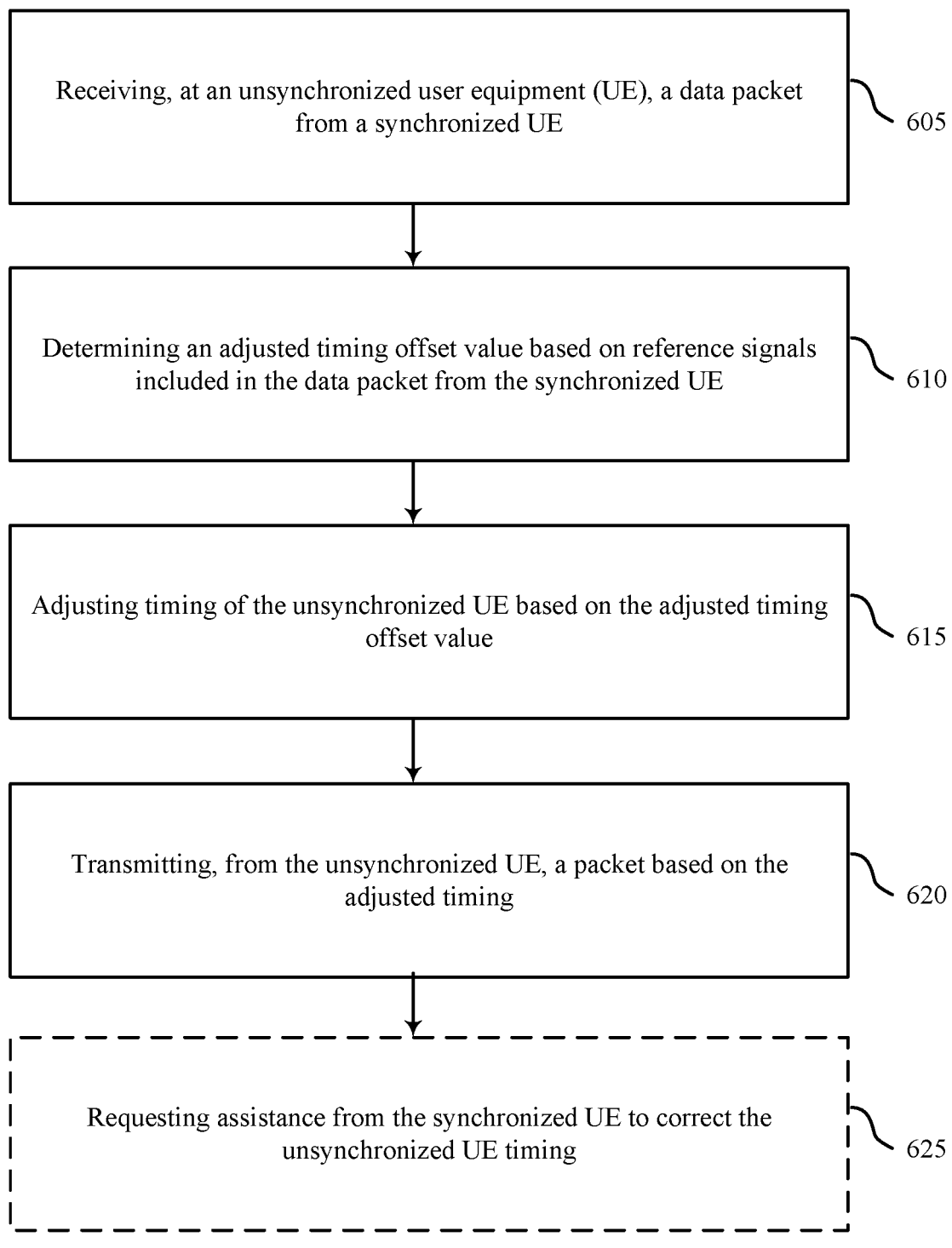
FIG. 6 is a flow diagram of an example of a method of wireless communication implemented by an unsynchronized UE in accordance with aspects of the present disclosure.

FIG. 6 is a flowchart of an example method 600 for wireless communications in accordance with aspects of the present disclosure. The method 600 may be performed using the UE 104, or a component thereof, such as the processor 512 and/or the modem 514 and/or the synchronization management component 550 and/or one of its subcomponents. In some examples, the method 600 may be executed by an unsynchronized UE 104 (e.g., UE 104-*b* described with reference to FIGS. 1, 2, and 4 and 5). In some aspects, the unsynchronized UE may have been previously synchronized to one or more of a base station or a GNSS prior to losing connection or communication, and hence, losing synchronization. In some aspects, losing connection or communication with the one or the both of the base station and the GNSS may trigger the adjusting of the timing based on the adjusted timing offset value as indicated below. In some examples, the unsynchronized UE may lack sidelink synchronization capability to support transmission and reception of sidelink synchronization signals from SyncRef UEs. Although the method 600 is described below with respect to the elements of the UE 104, other components may be used to implement one or more of the steps described herein.

At block 605, the method 600 may include receiving, at an unsynchronized UE, a data packet from a synchronized UE. In some examples, the data packet may be received by the transceiver 502 and forwarded to the processor 512 and/or modem 514 and/or synchronization management component 550 of the UE 104, for example, as described above with reference to FIG. 5. As such, in an aspect, the UE 104, transceiver 502, processor 512, modem 514, and/or synchronization management component 550 may define the means for receiving, at an unsynchronized UE, a data packet from a synchronized UE. The data packet received from the synchronized UE may include a synchronization state of the synchronized UE. In some examples, the synchronization state may identify whether the synchronized UE is synchronized to one or more of GNSS, base station, or another SyncRef UE. Further details of receiving, at an unsynchronized UE, a data packet from a synchronized UE are described above with reference to FIGS. 2, 4, and 7.

At block 610, the method 600 may include determining an adjusted timing offset value based on reference signals included in the data packet from the synchronized UE. In some examples, the autonomous timing correction component 570 of the modem 514 may determine the adjusted timing based on the timing associated with the earliest detectable path (if multiple data packets are received from multiple synchronized UEs). For example, as explained above, the unsynchronized UE 104-*b* may receive a first data packet 215-*a* from eNB synchronized UE 104-*a* prior to receiving a second data packet 215-*b* from GNSS synchronized UE 104-*c* due to the respective distance and propagation delay. In such instance, the first data packet 215-*a* is associated with the earliest detectable path, and the unsynchronized UE 104-*b* may adjust the timing based on the reference signals include in the first data packet 215-*a* received from eNB synchronized UE 104-*a* as opposed to the GNSS synchronized UE 104-*c*. Additionally or alternatively, the timing adjustments may be based on RSRP and time delay estimation (earliest path and/or center of mass, e.g., an average or mean or other mathematical function) from a plurality of, or from all synchronized UEs (e.g., eNB synchronized UE 104-*a* and/or GNSS synchronized UE 104-*c*). In other examples, the autonomous timing correction component 570 may determine the adjusted timing based on RSRP and/or time delay estimation (earliest path and/or center of mass) from all synchronized UEs. As such, in an aspect, the UE 104, transceiver 502, processor 512, modem 514, and/or autonomous timing correction component 570 may define the means for determining an adjusted timing offset value based on reference signals included in the data packet from the synchronized UE. For instance, the unsynchronized UE may measure a RSRP for the received data packet and estimate time delay from transmission to reception of the data packet in order to determine the adjusted timing offset value. Accordingly, the unsynchronized UE may determine the adjusted timing offset value based in part on one or both of RSRP or the estimated time delay. Further details of determining an adjusted timing offset value based on reference signals included in the data packet from the synchronized UE are described above with reference to FIGS. 2, 4, and 7.

At 615, the method 600 may include adjusting timing of the unsynchronized UE based on the adjusted timing offset value to define an adjusted timing. Aspects of block 615 may be performed by autonomous timing correction component 570 described with reference to FIG. 5 by taking the determined adjusted timing and setting it as the current timing for Tx/Rx of the unsynchronized UE. As such, in an aspect, the UE 104, transceiver 502, processor 512, modem 514, and/or autonomous timing correction component 570 may define the means for adjusting timing of the unsynchronized UE based on the adjusted timing offset value to define an adjusted timing.

At block 620, the method 600 may include transmitting or receiving, at the unsynchronized UE, a signal based on the adjusted timing. In some examples, the packet may be transmitted by the transceiver 502 of the UE 104 as described above with reference to FIG. 5. In some aspects, the packet transmitted by the unsynchronized UE includes a synchronization state of the unsynchronized UE. For example, the synchronization state may inform recipient of the packet (e.g., other UEs or devices) that the unsynchronized UE is relying on autonomous timing adjustments. As such, in an aspect, the UE 104, transceiver 502, processor 512, and/or modem 514 may define the means for transmitting or receiving, at the unsynchronized UE, a signal based on the adjusted timing.

At block 625, the method 600 may optionally include requesting assistance from the synchronized UE to correct the unsynchronized UE timing. For example, the message generation component 560 may generate and transmit, via the transceiver 502, a request for assistance from the synchronized UE to correct the unsynchronized UE timing. The request may include information regarding the adjusted timing offset value. Further, the autonomous timing correction component 570 may adjust the timing of the unsynchronized UE based on the timing correction received from the synchronized UE for subsequent transmissions. As such, in an aspect, the UE 104, transceiver 502, processor 512, modem 514, and/or autonomous timing correction component 570 may define the means for requesting assistance from the synchronized UE to correct the unsynchronized UE timing.

It should be understood that requesting assistance from the synchronized UE to correct the unsynchronized UE timing may be embedded in the packet transmitted at block 620.

Figure 7:
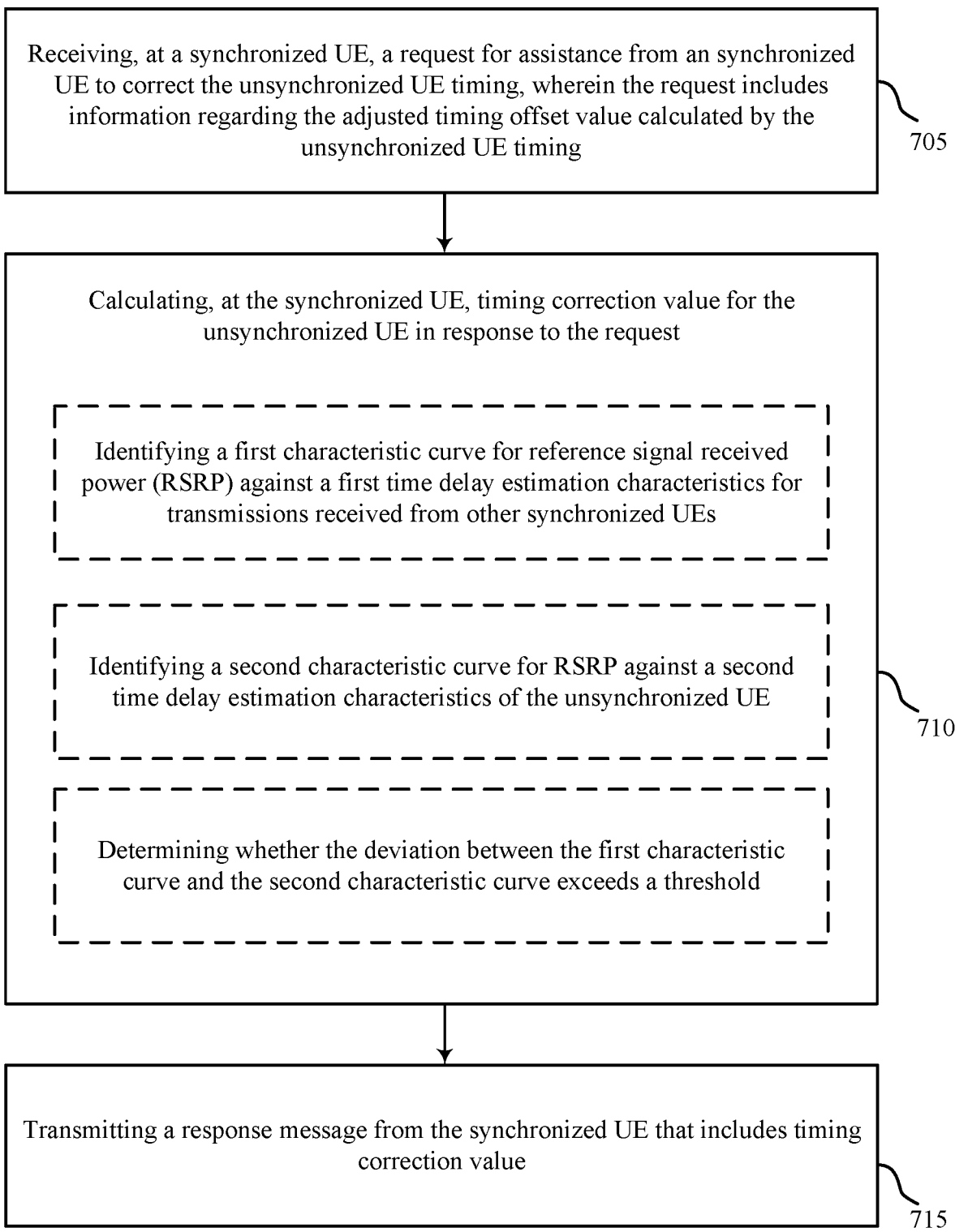
FIG. 7 is a flow diagram of an example of a method of wireless communication implemented by a synchronized UE in accordance with aspects of the present disclosure.

FIG. 7 is a flowchart of an example method 700 for wireless communications in accordance with aspects of the present disclosure. The method 700 may be performed using the UE 104. In some examples, the method 700 may be executed by a synchronized UE 104 (e.g., UE 104-*a* or UE 104-*c* described with reference to FIGS. 1, 2, and 4). In some aspects, the synchronized UE may be synchronized to one or more of a base station, a GNSS, or SyncRef UE. Although the method 700 is described below with respect to the elements of the UE 104, other components may be used to implement one or more of the steps described herein.

At block 705, the method may include receiving a request for synchronization assistance from an unsynchronized UE to correct a timing of the unsynchronized UE, wherein the request includes information regarding an adjusted timing offset value calculated by the unsynchronized UE based on reference signals included in one or more data packets from one or more synchronized UE. In some examples, the transceiver 502 may receive the request and forward the request to the modem 514 to be processed by the synchronization management component 550. As such, in an aspect, the UE 104, transceiver 502, processor 512, modem 514, and/or the synchronization management component 550 may define the means for receiving a request for synchronization assistance from an unsynchronized UE to correct a timing of the unsynchronized UE, wherein the request includes information regarding an adjusted timing offset value calculated by the unsynchronized UE based on reference signals included in one or more data packets from one or more synchronized UE.

At block 710, the method 700 may include calculating a timing correction value for the unsynchronized UE in response to the request. In some examples, calculating the timing correction value may include identifying a first characteristic curve for RSRP against a first time delay estimation (e.g., first arrival path and center of mass) characteristics in the local neighborhood using the transmissions from other synchronized UEs 104. The method may also include identifying a second characteristic curve for RSRP against a second time delay estimation characteristics of the unsynchronized UE 104. The synchronized UE 104, and more particularly the timing correction component 570 of the modem 514, may then determine whether the deviation between the first characteristic curve and the second characteristic curve exceeds a threshold. Specifically, the synchronized UE 104 may determine if the observed RSRP against the time delay estimation of the un-synchronized UE 104 deviates significantly from the characteristics determined using synchronized UEs. If the deviation exceeds the threshold, the synchronized UE 104 may generate a timing correction based on least-square (LS) fitting to the characteristic curve. Alternatively, if the deviation does not exceed the threshold, the synchronized UE 104-*a* may not apply new timing correction. As such, in an aspect, the UE 104, transceiver 502, processor 512, and/or modem 514 may define the means for calculating a timing correction value for the unsynchronized UE in response to the request.

At 715, the method 700 may include transmitting a response message to the unsynchronized UE that includes timing correction value. In some examples, the response message may be transmitted by the transceiver 502 of the UE 104 as described above with reference to FIG. 5. The transmission of the response message may allow the unsynchronized UE to obtain the timing information required to resynchronize with a GNSS and/or eNB using sidelink communication. As such, in an aspect, the UE 104, transceiver 502, processor 512, and/or modem 514 may define the means for transmitting a response message to the unsynchronized UE that includes timing correction value.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Some Further Example Implementations

An example for wireless communications, comprising: receiving, at an unsynchronized user equipment (UE), a data packet from a synchronized UE; determining an adjusted timing offset value based on reference signals included in the data packet from the synchronized UE; adjusting a timing of the unsynchronized UE based on the adjusted timing offset value to define an adjusted timing; and transmitting or receiving, at the unsynchronized UE, a signal based on the adjusted timing.

The above example method, wherein the unsynchronized UE was previously synchronized to one or both of a base station or a global navigation satellite system (GNSS), wherein losing communication with the one or the both of the base station and the GNSS triggers the adjusting of the timing based on the adjusted timing offset value.

Any of the above example methods, wherein the unsynchronized UE lacks sidelink synchronization capability to support transmission and reception of sidelink synchronization signals.

Any of the above example methods, wherein the data packet received from the synchronized UE includes a synchronization state of the synchronized UE, wherein the synchronization state identifies whether the synchronized UE is synchronized to one or more of a global navigation satellite system (GNSS), a base station, or a second synchronized UE.

Any of the above example methods, wherein the signal transmitted by the unsynchronized UE includes a synchronization state of the unsynchronized UE, wherein the synchronization state identifies that the unsynchronized UE is relying on autonomous timing adjustments.

Any of the above example methods, further comprising: transmitting a request for synchronization assistance from the synchronized UE to correct the timing of the unsynchronized UE, wherein the request includes information regarding the adjusted timing offset value; receiving a response message from the synchronized UE that includes a timing correction in response to the request; and revising the adjusted timing of the unsynchronized UE based on the timing correction received from the synchronized UE for subsequent transmissions.

Any of the above example methods, wherein determining the adjusted timing offset value comprises: measuring a reference signal received power (RSRP) for the received data packet and/or estimating time delay from transmission to reception of the data packet; and determining the adjusted timing offset value based in part on one or both of the RSRP or the estimated time delay.

An example user equipment (UE) for wireless communications, comprising: a memory configured to store instructions; a processor communicatively coupled with the memory, the processor configured to execute the instructions to: receive a data packet from a synchronized UE; determine an adjusted timing offset value based on reference signals included in the data packet from the synchronized UE; adjust a timing of the unsynchronized UE based on the adjusted timing offset value to define an adjusted timing; and transmit or receive, at the unsynchronized UE, a signal based on the adjusted timing.

The above example UE, wherein the unsynchronized UE was previously synchronized to one or both of a base station or a global navigation satellite system (GNSS), wherein losing communication with the one or the both of the base station and the GNSS triggers the adjusting of the timing based on the adjusted timing offset value.

Any of the above example UEs, wherein the unsynchronized UE lacks sidelink synchronization capability to support transmission and reception of sidelink synchronization signals.

Any of the above example UEs, wherein the data packet received from the synchronized UE includes a synchronization state of the synchronized UE, wherein the synchronization state identifies whether the synchronized UE is synchronized to one or more of a global navigation satellite system (GNSS), a base station, or a second synchronized UE.

Any of the above example UEs, wherein the signal transmitted by the unsynchronized UE includes a synchronization state of the unsynchronized UE, wherein the synchronization state identifies that the unsynchronized UE is relying on autonomous timing adjustments.

Any of the above example UEs, wherein the processor is configured to execute the instructions to: transmit a request for synchronization assistance from the synchronized UE to correct the timing of the unsynchronized UE, wherein the request includes information regarding the adjusted timing offset value; receive a response message from the synchronized UE that includes a timing correction in response to the request; and revise the adjusted timing of the unsynchronized UE based on the timing correction received from the synchronized UE for subsequent transmissions.

Any of the above example UEs, wherein the instructions to determine the adjusted timing offset value, further are executable by the processor to: measure a reference signal received power (RSRP) for the received data packet and/or estimating time delay from transmission to reception of the data packet; and determine the adjusted timing offset value based in part on one or both of the RSRP or the estimated time delay.

An example, a non-transitory computer readable medium storing instructions, executable by a processor, for wireless communications by an unsynchronized user equipment (UE), comprising instructions for: receiving, at the unsynchronized user equipment (UE), a data packet from a synchronized UE; determining an adjusted timing offset value based on reference signals included in the data packet from the synchronized UE; adjusting a timing of the unsynchronized UE based on the adjusted timing offset value to define an adjusted timing; and transmitting or receiving, at the unsynchronized UE, a signal based on the adjusted timing.

The above example computer readable medium, wherein the unsynchronized UE was previously synchronized to one or both of a base station or a global navigation satellite system (GNSS), wherein losing communication with the one or the both of the base station and the GNSS triggers the adjusting of the timing based on the adjusted timing offset value.

Any of the above example computer readable medium, wherein the unsynchronized UE lacks sidelink synchronization capability to support transmission and reception of sidelink synchronization signals.

Any of the above example computer readable medium, wherein the data packet received from the synchronized UE includes a synchronization state of the synchronized UE, wherein the synchronization state identifies whether the synchronized UE is synchronized to one or more of a global navigation satellite system (GNSS), a base station, or a second synchronized UE.

Any of the above example computer readable medium, wherein the signal transmitted by the unsynchronized UE includes a synchronization state of the unsynchronized UE, wherein the synchronization state identifies that the unsynchronized UE is relying on autonomous timing adjustments.

An example apparatus for wireless communications by an unsynchronized user equipment (UE), comprising: means for receiving, at the unsynchronized user equipment (UE), a data packet from a synchronized UE; means for determining an adjusted timing offset value based on reference signals included in the data packet from the synchronized UE; means for adjusting a timing of the unsynchronized UE based on the adjusted timing offset value to define an adjusted timing; and means for transmitting or receiving, at the unsynchronized UE, a signal based on the adjusted timing.

The above example apparatus, wherein the unsynchronized UE was previously synchronized to one or both of a base station or a global navigation satellite system (GNSS), wherein losing communication with the one or the both of the base station and the GNSS triggers the adjusting of the timing based on the adjusted timing offset value.

Any of the above example apparatus, wherein the unsynchronized UE lacks sidelink synchronization capability to support transmission and reception of sidelink synchronization signals.

Any of the above example apparatus, wherein the data packet received from the synchronized UE includes a synchronization state of the synchronized UE, wherein the synchronization state identifies whether the synchronized UE is synchronized to one or more of a global navigation satellite system (GNSS), a base station, or a second synchronized UE.

Any of the above example apparatus, wherein the signal transmitted by the unsynchronized UE includes a synchronization state of the unsynchronized UE, wherein the synchronization state identifies that the unsynchronized UE is relying on autonomous timing adjustments.

Any of the above example apparatus, further comprising: means for transmitting a request for synchronization assistance from the synchronized UE to correct the timing of the unsynchronized UE, wherein the request includes information regarding the adjusted timing offset value; receiving a response message from the synchronized UE that includes a timing correction in response to the request; and revising the adjusted timing of the unsynchronized UE based on the timing correction received from the synchronized UE for subsequent transmissions.

Any of the above example apparatus, wherein the means for determining the adjusted timing offset value comprises: measuring a reference signal received power (RSRP) for the received data packet and/or estimating time delay from transmission to reception of the data packet; and means for determining the adjusted timing offset value based in part on one or both of the RSRP or the estimated time delay.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
    receiving, at an user equipment (UE), a data packet from a second UE comprising information for timing synchronization and an indication of reliability of the information for timing synchronization;
    determining an adjusted timing offset value based, at least in-part, on the information for timing synchronization and the indication of reliability of the information for timing synchronization;
    adjusting a timing of the UE based on the adjusted timing offset value to define an adjusted timing; and
    transmitting or receiving, at the UE, a signal based on the adjusted timing, wherein the signal when transmitted by the UE includes a synchronization state of the UE that indicates that the UE is relying on autonomous timing adjustments.

2. The method of claim 1, wherein the adjusting of the timing based on the adjusted timing offset value is based, at least in-part, in response to a loss of communication with a base station, a global navigation satellite system (GNSS), or both.

3. The method of claim 1, wherein the UE lacks sidelink synchronization capability to support transmission and reception of sidelink synchronization signals.

4. The method of claim 1, wherein the data packet received from the second UE includes a synchronization state of the second UE, wherein the synchronization state identifies that the second UE is synchronized to at least one other UE.

5. The method of claim 1, further comprising:
    transmitting a request for synchronization assistance to the second UE, wherein the request for synchronization assistance includes information regarding the adjusted timing offset value;
    receiving a response message from the second UE that includes a timing correction in response to the request for synchronization assistance; and
    wherein the determining the adjusted timing offset value is further based, at least in-part, on the timing correction.

6. The method of claim 1, wherein the determining the adjusted timing offset value further comprises:
    determining a reference signal received power (RSRP) for the received data packet an estimated time delay from transmission to reception of the data packet, or both; and
    determing the adjusted timing offset value based, at least in-part, on one or both of the RSRP or the estimated time delay.

7. The method of claim 1, wherein the indication of reliabilty of the information for timing synchronization is indicative, at least in-part, of a hop count corresponding to at least a portion of the information for timing synchronization.

8. The method of claim 1, wherein the information for timing synchronization is derived in-part by decoding a reference signal included in the data packet received from the second UE.

9. An user equipment (UE) for wireless communications, comprising:
    a memory configured to store instructions; and
    a processor communicatively coupled with the memory, the processor configured to execute the instructions to:
        receive a data packet from a second UE comprising information for timing synchronization and an indication of reliability of the information for timing synchronization;
        determine an adjusted timing offset value, at least in-part, on the information for timing synchronization and the indication of reliability of the information for timing synchronization;
        adjust a timing of the UE based on the adjusted timing offset value to define an adjusted timing; and
        transmit or receive, at the UE, a signal based on the adjusted timing, wherein the signal when transmitted by the UE includes a synchronization state of the UE that indicates that the UE is relying on autonomous timing adjustments.

10. The UE of claim 9, wherein the processor is further configured to execute the instructions to adjust the timing of the UE based on the adjusted timing offset value based, at least in part, in response to a loss of communication with a base station, a global navigation satellite system (GNSS), or both.

11. The UE of claim 9, wherein the UE lacks sidelink synchronization capability to support transmission and reception of sidelink synchronization signals.

12. The UE of claim 9, wherein the data packet received from the second UE includes a second synchronization state of the second UE, wherein the second synchronization state identifies that the second UE is synchronized to at least one other UE.

13. The UE of claim 9, wherein the processor is configured to execute the instructions to:
    transmit a request for synchronization assistance to the second UE, wherein the request for synchronization assistance includes information regarding the adjusted timing offset value;
    receive a response message from the second UE that includes a timing correction in response to the request for synchronization assistance; and
    determine the adjusted timing offset value is further based, at least in-part, on the timing correction.

14. The UE of claim 9, wherein the instructions to determine the adjusted timing offset value, further are executable by the processor to:

determine a reference signal received power (RSRP) for the received data packet, an estimated time delay from transmission to reception of the data packet, or both; and determine the adjusted timing offset value based in part on one or both of the RSRP or the estimated time delay.

15. The UE of claim 9, wherein the indication of reliability of the information for timing synchronization is indicative of a hop count corresponding to at least a portion of the information for timing synchronization.

16. The UE of claim 9, wherein the information for timing synchronization is derived in-part by decoding a reference signal included in the data packet received from the second UE.

17. A non-transitory computer readable medium storing instructions, executable by a processor, for wireless communications by a user equipment (UE), comprising instructions for:

receiving, at the UE, a data packet from a second UE comprising information for timing synchronization and an indication of reliability of the information for timing synchronization;

determining an adjusted timing offset value based, at least in-part, on the information for timing synchronization and the indication of reliability of the information for timing synchronization;

adjusting a timing of the UE based on the adjusted timing offset value to define an adjusted timing; and transmitting or receiving, at the UE, a signal based on the adjusted timing, wherein the signal when transmitted by the UE includes a synchronization state of the UE that indicates that the UE is relying on autonomous timing adjustments.

18. The computer readable medium of claim 17, wherein the adjusting of the timing based on the adjusted timing offset value is based, at least in part, in response to a loss of communication with a base station, a global navigation satellite system (GNSS), or both.

19. The computer readable medium of claim 17, wherein the UE lacks sidelink synchronization capability to support transmission and reception of sidelink synchronization signals.

20. The computer readable medium of claim 17, wherein the data packet received from the second UE includes a second synchronization state of the second UE, wherein the second synchronization state identifies that the second UE is synchronized to at least one other UE.

21. The computer readable medium of claim 17, wherein the indication of reliability of the information for timing synchronization is indicative of a hop count corresponding to at least a portion of the information for timing synchronization.

22. The computer readable medium of claim 17, wherein the information for timing synchronization is derived in-part by decoding a reference signal included in the data packet received from the second UE.

23. An apparatus for wireless communications by a user equipment (UE), comprising:

means for receiving, at the user equipment (UE), a data packet from a second UE comprising information for timing synchronization and an indication of reliability of the information for timing synchronization;

means for determining an adjusted timing offset value based, at least in-part, on the information for timing synchronization and the indication of reliability of the information for timing synchronization;

means for adjusting a timing of the UE based on the adjusted timing offset value to define an adjusted timing; and means for transmitting or receiving, at the UE, a signal based on the adjusted timing, wherein the signal when transmitted by the UE includes a synchronization state of the UE that indicates that the UE is relying on autonomous timing adjustments.

24. The apparatus of claim 23, wherein the data packet received from the second UE includes a second synchronization state of the second UE, wherein the second synchronization state identifies that the second UE is synchronized to at least one other UE.

25. The apparatus of claim 23, wherein the indication of reliability of the information for timing synchronization is indicative of a hop count corresponding to at least a portion of the information for timing synchronization.

* * * * *